(12) United States Patent
Nicoleau

(10) Patent No.: US 12,072,418 B2
(45) Date of Patent: Aug. 27, 2024

(54) METHOD FOR MEASURING A DISTANCE FROM A VEHICLE TO A PLATFORM

(71) Applicant: ALSTOM Transport Technologies, Saint-Ouen-sur-Seine (FR)

(72) Inventor: Grégoire Nicoleau, Saint-Ouen-sur-Seine (FR)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 273 days.

(21) Appl. No.: 17/453,137

(22) Filed: Nov. 1, 2021

(65) Prior Publication Data

US 2022/0137217 A1 May 5, 2022

(30) Foreign Application Priority Data

Nov. 4, 2020 (FR) ..................................... 20 11300

(51) Int. Cl.
*G01S 17/42* (2006.01)
*G01S 17/931* (2020.01)

(52) U.S. Cl.
CPC ............ *G01S 17/42* (2013.01); *G01S 17/931* (2020.01)

(58) Field of Classification Search
CPC ...... G01S 17/42; G01S 17/931; G01S 7/4808; G01S 17/08; G01S 17/89
USPC ........................................................ 356/614
See application file for complete search history.

(56) References Cited

U.S. PATENT DOCUMENTS

| 3,765,692 | A | 10/1973 | Barber et al. |
| 6,637,348 | B1 | 10/2003 | Teichmann et al. |
| 7,185,592 | B2 | 3/2007 | Hommen et al. |
| 10,507,848 | B2 | 12/2019 | Demarquilly et al. |
| 2010/0048313 | A1* | 2/2010 | Mooney ............. A63B 24/0021 473/409 |
| 2017/0174231 | A1 | 6/2017 | Bochud et al. |
| 2017/0334464 | A1* | 11/2017 | Demarquilly ........ B61D 23/025 |
| 2018/0001914 | A1 | 1/2018 | Dausoa |
| 2019/0315380 | A1* | 10/2019 | Clavier ..................... B61F 5/10 |
| 2020/0312052 | A1* | 10/2020 | Bonnevay .............. G07C 5/085 |
| 2021/0221411 | A1* | 7/2021 | Farooqui ................ G06V 20/56 |

FOREIGN PATENT DOCUMENTS

| EP | 1787613 A2 | 5/2007 |
| EP | 2873582 A1 | 5/2015 |
| FR | 3053301 A1 | 1/2018 |

(Continued)

OTHER PUBLICATIONS

French Search Report issued for French Patent Application No. FR 20 11300, dated Jul. 19, 2021 in 2 pages.

*Primary Examiner* — Md M Rahman
(74) *Attorney, Agent, or Firm* — KNOBBE, MARTENS, OLSON & BEAR LLP

(57) ABSTRACT

A method for measuring a given distance between a vehicle and an upper surface of a platform includes projecting two or more beams by a detection system mounted on the vehicle. The beams lie in a single plane of projection towards the platform. For each beam, a distance is measured between the detection system and the platform along a respective direction of the beam. The measured distances not corresponding to the upper surface are excluded. A vertical distance between a vehicle marker and the upper surface of the platform is calculated from the distances that are not excluded.

10 Claims, 3 Drawing Sheets

(56) References Cited

FOREIGN PATENT DOCUMENTS

| | | |
|---|---|---|
| JP | H05116627 A | 5/1993 |
| JP | 2006-027477 A | 2/2006 |
| JP | 2011-016432 A | 1/2011 |
| WO | 2010/142657 A1 | 12/2010 |

* cited by examiner

METHOD FOR MEASURING A DISTANCE FROM A VEHICLE TO A PLATFORM

CROSS-REFERENCE TO RELATED APPLICATION

This application claims priority to French Patent Application No. FR 20 11300, filed on Nov. 4, 2020, the disclosure of which including the specification, the drawings, and the claims is hereby incorporated by reference in its entirety.

FIELD OF THE INVENTION

The present invention relates to a method for measuring a distance between a vehicle, in particular a rail or road transport vehicle, for example a guided road transport vehicle, and a platform.

BACKGROUND OF THE INVENTION

Document EP 2 873 582 A1 describes a device for controlling a gap filler and an associated control method, in which the deployment of the gap filler and/or the opening of the door is decided on the basis of detection information. This information is provided by an image processing unit that acquires reflected waves from object contours.

However, this method does not provide a reliable measurement of a distance from a rail or road transport vehicle, especially a guided vehicle, to a platform.

For example, this allows the deployment of the gap filler to be precisely adapted to the geometry of the platform.

SUMMARY OF THE INVENTION

One of the purposes of the invention is to provide a method of reliably measuring a given distance from a vehicle to a platform.

For this purpose, the object of the invention is a measuring method of the above type comprising the following steps:
 providing a detection system mounted on the vehicle, the detection system being capable of projecting a beam towards the platform,
 projecting a plurality of beams by the detection system, the beams all lying in a single plane of projection towards the platform,
 measuring, for each beam, a distance between the detection system and the platform along a respective direction of said beam detected by the detection system,
 excluding a first part of the measured distances, the first part comprising the measured distances not corresponding to the upper surface, and
 calculating a vertical distance between a vehicle marker and the upper surface of the platform from distances not included in the first part.

By measuring a vertical distance of the rail or guided road transport vehicle to a platform, it is possible to adjust the height of the vehicle in order to reduce a vertical gap, if there is any, between the platform and an exit of the vehicle.

The method may furthermore exhibit one or more of the following features, taken in isolation or in any combination that is technically possible:
 the beam is a laser beam,
 the method includes a step of detecting an edge of the platform, including comparing the measured distances,
 the beam reaching the edge of the platform is the beam with the smallest measured distance between the detection system and the platform,
 each measured distance is associated with an angle between the corresponding beam and the vertical, the first excluded part of the measured distances corresponding to a predefined angle interval whose upper limit is the angle of the beam reaching the edge of the platform,
 the method comprises a step of excluding a second part of the measured distances, the second part comprising measurements corresponding to the upper surface of the platform, and a step of calculating a horizontal distance between the vehicle marker and an edge of the platform from distances not included in the second part, each measured distance being associated with an angle with respect to the vertical, the second part of the excluded measured distances corresponding to an angle interval with respect to the vertical, whose lower limit is the angle of the beam that reaches the edge of the platform,
 the method comprises a step of excluding distance values between the detection system and the platform, said values not meeting at least one predefined criterion,
 the method comprises:
  each measured distance is associated with an angle of the beam,
  for each angle, a range of expected distances is predetermined, and
  distances measured outside their distance interval are excluded in the value exclusion step;
 each measured distance is associated with an angle of the beam, for each angle whose associated distance is not excluded, a vertical distance between the marker and the platform is calculated from the associated measured distance, and
 for each angle to the vertical whose associated distance is not excluded, the vertical distance between the marker and the platform is calculated by the following formula: $H_{cl/q}'' = D_n \times \cos(\alpha_0 + \alpha_n) - H_{cl/c}$ where $H_{cl/q}''$ is the vertical distance between the marker and the point on the platform reached by the beam, $\alpha_0$ the angle between the vertical and the beam reaching the edge of the platform, $\alpha_n$ the angle between the edge of the platform and the beam corresponding to the measurement and $H_{cl/c}''$ the vertical distance between the marker and the detection system.

BRIEF DESCRIPTION OF THE DRAWINGS

Further features and advantages of the invention will be apparent from the detailed description given below, by way of indication and not in any way limiting, with reference to the appended figures, among which.

DETAILED DESCRIPTION OF THE PREFERRED EMBODIMENTS

The invention relates to a method of measuring a given distance between a vehicle 10, in particular a rail vehicle or a road transport vehicle, for example a guided road transport vehicle, and an upper surface 14 of a platform 16. More particularly, the given distance is measured between a marker 12 of said vehicle and said upper surface 14 of the platform 16.

The platform 16 is, for example, a platform of a rail or guided road transport vehicle station. Alternatively, platform 16 is a sidewalk next to which the vehicle is parked.

An elevation direction Z is defined as the direction perpendicular to a running plane of the vehicle, a longitudinal direction X is defined as the usual direction of travel of the vehicle in the conventional sense and a transverse direction Y is defined as the direction perpendicular to the longitudinal direction X and the elevation direction Z.

A dimension in the direction of elevation is called "height".

The marker 12 is, for example, a point of a gap filler provided to reduce the distance between an exit of the vehicle 10 and the platform 16, so as to facilitate the boarding and/or alighting of passengers and objects.

The vehicle 10 is, for instance, parked at the platform 16.

Figure 1:
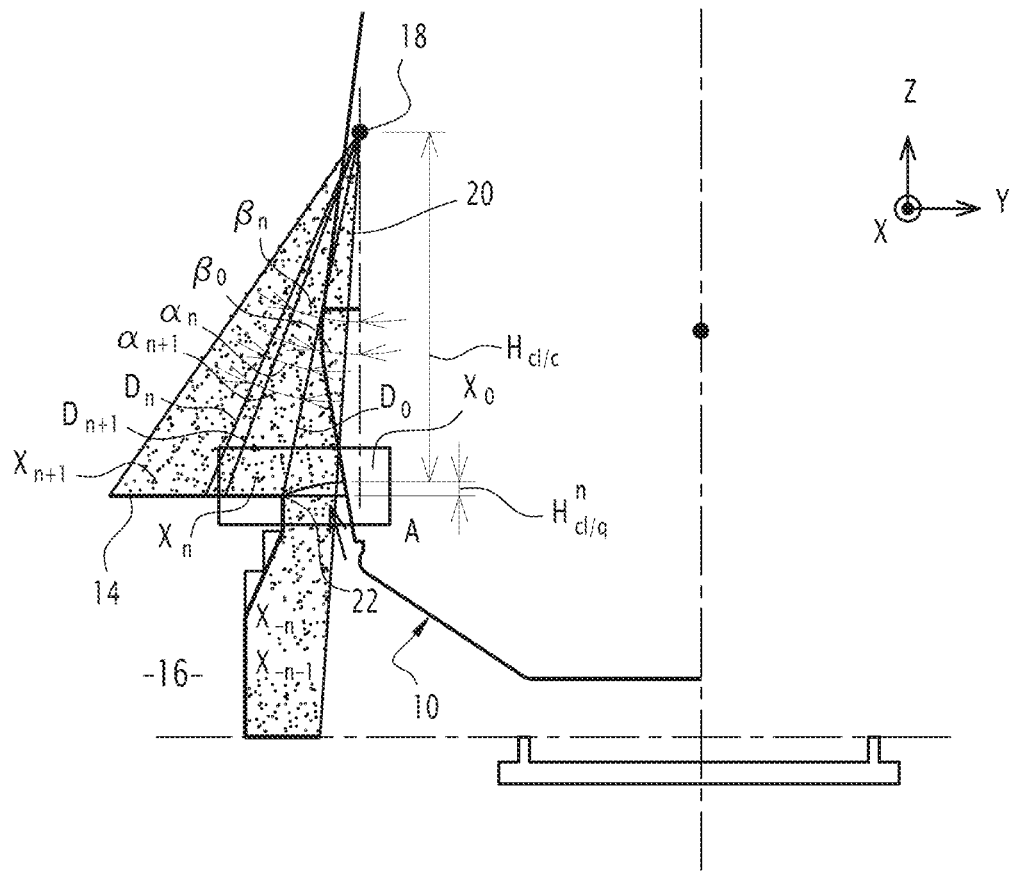
FIG. 1 is a schematic view of a vehicle near a platform.
Figure 2:
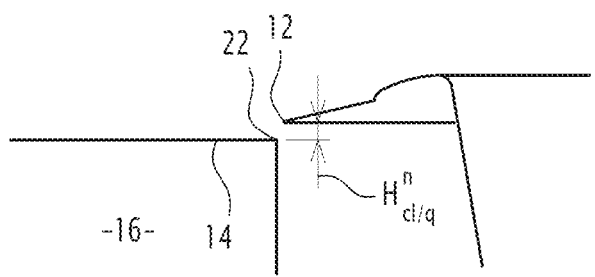
FIG. 2 is an enlarged schematic view of zone A of FIG. 1.
Figure 3:
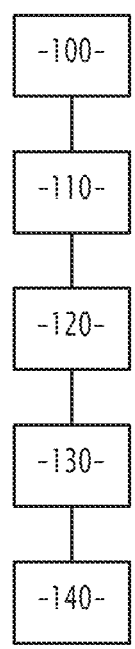
FIG. 3 is a schematic view of a method according to a first embodiment of the invention.

The measurement method, according to a first embodiment of the invention shown in FIG. 3, comprises the following steps:

providing 100 of a detection system 18 mounted on the vehicle 10, projecting 110 of a plurality of beams by the detection system, measuring 120, for each beam, a distance between the detection system and the platform according to said beam detected by the detection system, excluding 130 a first part of the measured distances, and calculating 140 a vertical distance between a vehicle marker and the upper surface of the platform from distances not included in the first part of the measured distances.

The detection system 18 is able to project a beam 20, for example a laser beam, towards the platform 16.

Alternatively, the beam 20 is a radar technology beam or an ultrasonic beam.

The detection system 18 is further adapted to detect the beam returned from an obstacle and to measure the time interval between the emitted beam and said returned beam, so as to calculate the distance between the detection system 18 and the obstacle according to the direction of the emitted beam.

The detection system 18 can, for example, perform laser remote sensing (or "lidar").

In particular, the use of laser remote sensing allows a particularly open field of view of the detection system 18, for example between 0° and 270°, so that a platform edge at which the vehicle is parked is always in the field of view.

Advantageously, each beam emitted by the detection system comprises a plurality of echoes, i.e. the beam is composed of a plurality of laser pulses. The detection system 18 is able to distinguish each of the echoes of the beam when detecting the beam.

In particular, the plurality of echoes allows the detection system to function better in rain, fog and/or snow. For example, if it's raining, the first echo is likely to encounter a drop of water falling through the path of the beam, while the second echo would measure the distance to the next obstacle, such as the platform.

The detection system 18 is mounted on the vehicle at a height above a maximum platform height. The maximum platform height is the maximum height that a platform is likely to have next to the vehicle.

The maximum platform height is, for example, the height of an outer door step of the vehicle plus or minus a margin between 0 and 500 mm.

During the projection step 110, the beams emitted by the detection system 18 are all included in the same projection plane towards the platform.

The projection plane extends in the transverse Y and elevation Z directions. Thus, the projection plane is substantially perpendicular to the longitudinal direction.

Each beam extends from the detection system 18 in a respective main direction.

The beams form an angular interval from the detection system 18, a first bound of the angular interval being between 0 and 10 degrees to the direction of elevation and a second bound of the angular interval being between 30 and 45 degrees to the direction of elevation.

The angular interval is on the same side of the detection system 18 with respect to the elevation direction Z, more particularly on the side including the platform 16.

The detection system 18 emits, for example, beams with a given angular pitch, typically between 0.25° and 2.5°. The angular step is here a multiple of 0.25°.

The beams are emitted one after another, close to each other. The projection step 110 is, for example, a step of scanning a laser beam at the given angular pitch in the projection plane.

Each beam emitted by the detection system 18 and reflected by an obstacle towards the detection system 18 is detected by said detection system 18.

The detection system 18 then measures the distance between said detection system 18 and the obstacle, according to the time interval taken by the beam to be reflected by the obstacle.

In case of a beam consisting of a plurality of echoes, one measurement is selected as reflecting the measurement of the platform. For example, the measurement is the closest one to an expected value. Additionally or alternatively, the selected measurement is the measurement within a given range.

Alternatively, the selected measurement is the last measurement received for said beam.

The detection system 18 thus measures, for each beam, the distance between the detection system and the platform measured in the respective main direction of the beam.

Each beam and thus each measured distance is associated with an angle $\beta_n$ between the corresponding beam and the vertical.

The sensing system 18 is mounted on the vehicle 10 such that a predefined reference beam extends vertically such that the angle $\beta_n$ of said beam is zero. Each of the other beams is marked with respect to said reference beam, in particular by means of the number of angular steps between said beam and the reference beam.

This makes it possible, for example, to draw the profile of the platform in said plane from the detected beams.

Then, a first part of the measured distances is excluded 130.

The first part of the distances comprises, for example, measured distances that do not correspond to the upper surface 14, i.e. the point on the platform returning the beam corresponding to the measured distance is not included in the upper surface 14, and/or so-called "outliers" as will be described later.

In particular, the first part of the distances corresponds only to those measured distances that do not correspond to the upper surface 14 and/or to outliers.

To exclude measured distances that do not correspond to the upper surface of the platform, the method comprises, for example, a step of detecting an edge 22 of the platform 16.

Detection of the edge 22 of the platform here comprises the comparison of the measured distances, the beam reaching the edge 22 of the platform 16 being the one with the smallest measured distance between the detection system and the platform.

The excluded part not corresponding to the upper surface corresponds to a predefined range of angles $\beta_n$ whose upper bound is the angle of the beam $\beta_0$ reaching the edge 22 of the platform 16.

Additionally or alternatively, a value is excluded as an outlier when it does not meet at least one predefined criterion.

For example, for each angle corresponding to a measured distance, an interval of expected distances is predetermined. Where the measured distances are outside their expected distance range, the measured distances are excluded.

In one embodiment, the exclusion of so-called outliers is performed before the exclusion of values not corresponding to the upper surface 14 of the platform 16, so that the outliers do not risk distorting the detection of the edge 22 of the platform 16.

A value is likely to be an outlier when an obstacle such as a piece of luggage, a passenger or a surface defect, typically a platform, is present. The detected value corresponds to the value returned by said obstacle and not by the platform 16, so that it is discarded for a calculation related to the platform.

Then, for each angle whose associated distance is not excluded, the height between the marker and the platform is calculated from the associated measured distance.

More particularly, for each angle for which the associated distance is not excluded, the height between the marker and the platform is calculated by the following formula: $H_{cl/q}{}^n = D_n \times \cos(\alpha_0 + \alpha_n) - H_{cl/q}{}^n$ is the height between the marker and the point of the platform reached by the beam, $D_n$ the distance associated with the angle, $\alpha_0$ the angle between the vertical and the beam reaching the edge 16 of the platform, $\alpha_n$ the angle between the edge of the platform and the beam corresponding to the measurement, and $H_{cl/c}{}^n$ the height between the marker and the detection system.

Alternatively, the angle $\beta_n$ between the vertical and the beam corresponding to the measurement is known directly, so that the height is calculated by the following formula $H_{cl/q}{}^n = D_n \times \cos(\beta_n) - H_{cl/c}$.

Finally, a general height between the marker 12 of the vehicle 10 and the upper surface 14 of the platform is calculated.

Said general height is, for example, calculated by averaging the heights between the marker 12 and the points on the platform 16 reached by the calculated beams $H_{cl/q}{}^n$.

In particular, the calculation of the overall height between said marker 12 and the upper surface 14 allows the height of the vehicle 10 to be adjusted relative to the platform so as to reduce the overall height between the marker 12 of the vehicle 10 corresponding here to a gap filler and the upper surface 14 of the platform, for example, to facilitate access to the passenger compartment of the vehicle.

To adjust the height of the vehicle, it is, for example, possible to vary the height of the secondary suspension.

Alternatively, to detect the edge 22 of the platform, $H_{cl/q}{}^n$ is calculated for all non-outliers. The variation of the function $H_{cl/q}{}^n$ as a function of n allows the edge 22 of the platform to be detected. Indeed, for those angles where the beam meets the upper surface 14 of the platform 12, the height $H_{cl/q}{}^n$ is substantially constant as the upper surface 14 of a platform 12 in the vicinity of a vehicle 10 is usually substantially flat. For corners where the beam does not meet the upper surface 14 of the platform 12, the height $H_{cl/q}{}^n$ varies: in particular, the closer the beam is to the edge 22 of the platform, the lower the height $H_{cl/q}{}^n$. The edge 22 of the platform 16 corresponds to the measurement for which the behaviour of the function $H_{cl/q}{}^n$ as a function of n changes from a decreasing function to a substantially constant function or vice versa depending on the scanning direction of the beam.

In a second embodiment of the invention, the method comprises the following additional steps:
excluding a second part of the measured distances, and
calculating a horizontal distance between the vehicle marker and the edge of the platform from distances not included in the second part.

The second part comprises measurements corresponding to the upper surface 14 of the platform 12. This corresponds, for example, to a second angle interval whose lower limit is the angle of the beam reaching the edge 22 of the platform 16.

Then, for each angle for which the associated distance is not excluded, the horizontal distance, in particular the transverse distance, between the marker and the platform is calculated from the associated measured distance.

In particular, for each angle whose associated measured distance is not excluded, the height between the marker and the platform is calculated by one of the following formulas: $d_{cl/q}{}^n = D_n \times \sin(\alpha_0 + \alpha_n) - d_{cl/c}$ or $d_{cl/q}{}^n = D_n \times \sin(\beta_n) - d_{cl/c}$ where $d_{cl/q}{}^n$ is the transverse distance between the marker and the point on the platform reached by the beam and $d_{cl/c}{}^n$ the transverse distance between the marker and the detection system.

This allows the transverse distance between the vehicle 10 and the platform 16 to be known.

In particular, this indicates whether the vehicle 10 is suitable for the platform 16.

Alternatively or additionally, the transverse distance between the vehicle marker 12 and the edge 22 of the platform 16 in particular is measured, preferably by one of the above formulae.

This allows, for example, the adjustment of at least one deployment parameter of the gap filler to allow better access to the vehicle. For example, the transverse dimension of the gap filler outside the vehicle interior is adjustable, so that the gap filler is adapted to be extended a greater distance if the transverse distance to the platform is greater.

The calculation of the distance in the direction of elevation between a marker on the vehicle and the upper surface of the platform and/or the horizontal distance between a point on the vehicle and the platform therefore allows for the adjustment of various parameters of the vehicle, such as the height of said vehicle or the size of a gap filler outside the interior of the vehicle, to allow for better vehicle access.

What is claimed is:

1. A method of measuring a given distance between a vehicle and an upper surface of a platform, comprising
   providing a detection system mounted on the vehicle,
   projecting a plurality of beams by the detection system towards the platform, the beams all lying in a single plane of projection towards the platform, each of the beams emitted at a different angle between the beam and a vertical direction,
   measuring, for each beam, a distance between the detection system and the platform along a respective direction of said beam detected by the detection system, detecting an edge of the platform by comparing the measured distances, excluding a first part of the measured distances, the first part comprising the measured distances not corresponding to the upper surface, calculating a vertical distance between a marker of the vehicle and the upper surface of the platform from measured distances which do not included the first part, wherein the vertical distance is calculated as a function of the measured distances for beams that are not excluded and the corresponding angle between each such beam and the vertical direction.

2. The measuring method according to claim 1, wherein the beam is a laser beam.

3. The measuring method according to claim 1, wherein the beam reaching the edge of the platform is the beam with the smallest measured distance between the detection system and the platform.

4. The measuring method according to claim 1, wherein each measured distance is associated with an angle between the corresponding beam and the vertical, the excluded first part of the measured distances corresponding to a predefined range of angles whose upper limit is the angle of the beam reaching the edge of the platform.

5. The measurement method according to claim 1, comprising a step of excluding a second part of the measured distances, the second part comprising measurements corresponding to the upper surface of the platform, and a step of calculating a horizontal distance between the marker of the vehicle and an edge of the platform from distances not included in the second part, each measured distance being associated with an angle to the vertical, the excluded second part of the measured distances corresponding to an angle interval with respect to the vertical, whose lower limit is the angle of the beam reaching the edge of the platform.

6. The measurement method according to claim 1, comprising a step of excluding distance values between the detection system and the platform, said values not meeting at least one predefined criterion.

7. The measurement method according to claim 6, wherein:

each measured distance is associated with an angle of the beam, for each angle, a range of expected distances is predetermined, and distances measured outside their distance interval are excluded in the value exclusion step.

8. The measuring method according to claim 1, wherein each measured distance is associated with an angle of the beam, for each angle whose associated distance is not excluded, a vertical distance between the marker and the platform is calculated from the associated measured distance.

9. The measuring method according to claim 8, wherein for each angle to the vertical whose associated distance is not excluded, the vertical distance between the marker and the platform is calculated by the following formula: $H_{cl/q}''=D_n \times \cos(\alpha_0+\alpha_n)-H_{cl/c}$ where $H_{cl/q}''$ is the vertical distance between the marker and the point on the platform reached by the beam, $\alpha 0$ is the angle between the vertical and the beam reaching the edge of the platform, $\alpha n$ is the angle between the edge of the platform and the beam corresponding to the measurement, and $H_{cl/q}''$ is the vertical distance between the marker and the detection system.

10. The measuring method according to claim 1, wherein the method detects the edge of the platform by (i) identifying a beam with the smallest measured distance between the detection system and the platform and (ii) comparing the measured distances.

* * * * *

UNITED STATES PATENT AND TRADEMARK OFFICE
CERTIFICATE OF CORRECTION

PATENT NO. : 12,072,418 B2
APPLICATION NO. : 17/453137
DATED : August 27, 2024
INVENTOR(S) : Grégoire Nicoleau It is certified that error appears in the above-identified patent and that said Letters Patent is hereby corrected as shown below:

In the Specification

In Column 5, Lines 36-37, delete "$H_{cl/q}^n = D_n \times \cos(\alpha_0 + \alpha_n) - H_{cl/q}^n$ is" and insert --$H_{cl/q}^n = D_n \times \cos(\alpha_0 + \alpha_n) - H_{cl/c}$ where $H_{cl/q}^n$ is--.

In the Claims

In Column 6, Claim 1, Line 58, delete "comprising" and insert --comprising:--.

In Column 7, Claim 1, Line 8, delete "included" and insert --include--.

Signed and Sealed this
Eleventh Day of March, 2025

Coke Morgan Stewart
*Acting Director of the United States Patent and Trademark Office*